J. A. HANSON.
SLED-BRAKE.
No. 183,667. Patented Oct. 24, 1876.
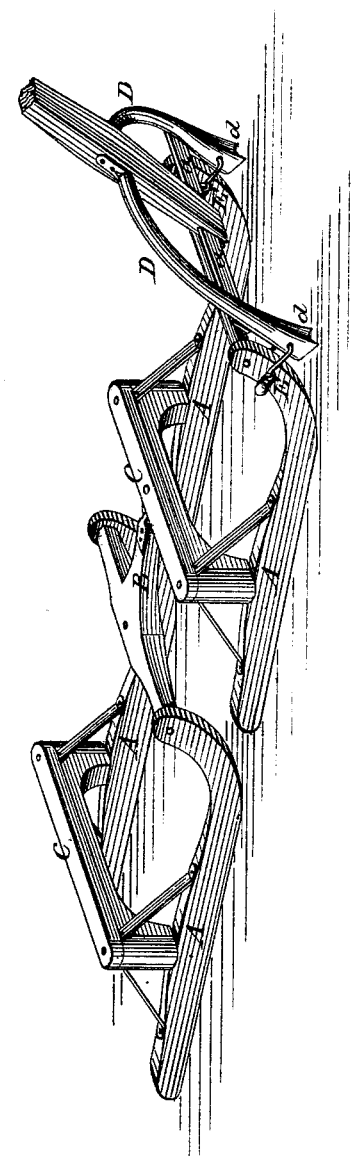
Attest:
M. F. Boyle
Jno. A. Madigan
Inventor:
Johan A. Hanson
by Louis Bagger & Co.
Att'ys.

UNITED STATES PATENT OFFICE.

JOHAN A. HANSON, OF WAGON LANDING, WISCONSIN.

IMPROVEMENT IN SLED-BRAKES.

Specification forming part of Letters Patent No. 183,667, dated October 24, 1876; application filed May 18, 1876.

*To all whom it may concern:*

Be it known that I, JOHAN A. HANSON, of Wagon Landing, in the county of Polk and State of Wisconsin, have invented certain new and useful Improvements in Sleigh-Brakes; and I do hereby declare that the following is a full, clear, and exact description thereof, which will enable others skilled in the art to which it appertains to make and use the same, reference being had to the accompanying drawings, and to letters of reference marked thereon, which form a part of this specification, and which show in perspective a sleigh having my improved braking device.

The object of my invention is to furnish a sleigh with a suitable braking device; and it consists in constructing the hounds in such a manner that when the draft upon the tongue ceases they will brake or stop the sleigh automatically, as hereinafter more fully shown and specified.

In the drawing, A A are the runners of the sleigh. B is the coupling; C C, the bolsters; and D D are the hounds, secured to the tongue by rivets and by means of the cross-brace *a*. The rear ends of the hounds are curved downwardly, and furnished with sharp points *d*, so as to readily enter the frozen ground. To the front ends of the front runners A are pivoted links or clevises E, by means of which the hounds are attached thereto. These links must be of sufficient length to allow the ends of the hounds to touch the ground and enter the same when the draft on the tongue is slackened.

From the foregoing description, the operation of my invention will be readily understood. When the sleigh is started and in motion, the hounds are raised from the ground, and do not therefore interfere with the draft of the sleigh; but as soon as it is desired to stop the sleigh, and the draft upon the tongue consequently ceases, the ends of the hounds rest upon the ground, and the front of runners A, to which they are pivoted, being in motion, forces them down into the ground, thus stopping the sleigh almost instantly.

The construction of my invention is simple and cheap, and it performs its functions in a satisfactory manner.

Having thus described my invention, I claim and desire to secure by Letters Patent of the United States—

The combination of the runners A, links E, and curved hounds D, having sharp points *d*, substantially as and for the purpose specified.

In testimony that I claim the foregoing as my own I have affixed my signature in presence of two witnesses.

JOHAN A. HANSON.

Witnesses:
W. E. FAY,
T. B. JEWELL.